United States Patent
Luong et al.

(10) Patent No.: US 11,481,609 B2
(45) Date of Patent: Oct. 25, 2022

(54) COMPUTATIONALLY EFFICIENT EXPRESSIVE OUTPUT LAYERS FOR NEURAL NETWORKS

(71) Applicant: Google LLC, Mountain View, CA (US)

(72) Inventors: Thang Minh Luong, Mountain View, CA (US); Quoc V. Le, Sunnyvale, CA (US); Zhilin Yang, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 15/931,408

(22) Filed: May 13, 2020

(65) Prior Publication Data

US 2020/0364543 A1     Nov. 19, 2020

Related U.S. Application Data

(60) Provisional application No. 62/847,222, filed on May 13, 2019.

(51) Int. Cl.
*G06N 3/04*        (2006.01)
*G06N 3/063*       (2006.01)
*G06N 7/00*        (2006.01)

(52) U.S. Cl.
CPC ......... *G06N 3/0481* (2013.01); *G06N 3/0454* (2013.01); *G06N 3/063* (2013.01); *G06N 7/005* (2013.01)

(58) Field of Classification Search
CPC .... G06N 3/0481; G06N 3/0454; G06N 3/063; G06N 7/005; G06N 3/0472; G06N 3/0445
See application file for complete search history.

(56) References Cited

PUBLICATIONS

Ahmed et al., "Weighted transformer network for machine translation", arXiv:1711.02132, Nov. 2017, 10 pages.
Al-Rfou et al., "Character-level language modeling with deeper self-attention", arXiv:1808.04444, Dec. 2018, 8 pages.
Baevski et al., "Adaptive input representations for neural language modeling", arXiv:1809.10853, Feb. 2019, 13 pages.
Chelba et al., "One billion word benchmark for measuring progress in statistical language modeling", arXiv:1312.3005, Dec. 2013, 6 pages.
Dai et al., "Transformer-xl: Attentive language models beyond a fixed-length context", arXiv:1901.02860, Jun. 2019, 20 pages.
Dehghani et al., "Universal transformers", arXiv:1807.03819, Jul. 2018, 23 pages.
Edunov et al, "Understanding back-translation at scale" arXiv, 2018, 12 pages.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on computer storage media, for incorporating a computationally efficient expressive output layer in a neural network. The output layer is configured to map a received hidden state to a probability distribution over a vocabulary of possible outputs by generating, from the hidden state, a respective context embedding for each of a plurality of gates; for each of the possible outputs in the vocabulary, computing a gated logit for the possible output by applying an output embedding for the possible output to the weighed sum; and generating the probability distribution over the vocabulary of possible outputs by applying a softmax to the gated logits for the possible outputs in the vocabulary.

20 Claims, 4 Drawing Sheets

(56) References Cited

PUBLICATIONS

Grave et al., "Efficient softmax approximation for gpus", Proceedings of the 34th International Conference on Machine Learning, Jun. 2017, 70:1302-1310.
Kanai et al., "Sigsoftmax: Reanalysis of the softmax bottleneck", Advances in Neural Information Processing Systems, May 2018, pp. 284-294.
Kong et al., "Fast and simple mixture of softmaxes with bpe and hybrid-lightrnn for language generation", arXiv:1809.09296, Sep. 2018, 9 pages.
Merity et al., "Regularizing and optimizing LSTM language models", arXiv:1708.02182, Aug. 2017, 10 pages.
Mikolov et al., "Recurrent neural network based language model", 11th Annual Conference of the International Speech Communication Association, Sep. 2010, 1045-1048.
Ott et al., "Scaling neural machine translation", arXiv:1806.00187, Sep. 2018, 9 pages.
Salimans et al., "Weight normalization: A simple reparameterization to accelerate training of deep neural networks", Advances in Neural Information Processing Systems, Jun. 2016, pp. 901-909.
Sennrich et al., "Neural machine translation of rare words with subword units", arXiv:1508.07909, Aug. 2015, 11 pages.
Shaw et al., "Self-attention with relative position representations", arXiv:1803.02155, Apr. 2018, 5 pages.
Shazeer et al., "Mesh-tensorflow: Deep learning for supercomputers", Advances in Neural Information Processing Systems, Dec. 2018, pp. 10435-10444.
Vaswani et al., "Attention is all you need", Advances in Neural Information Processing Systems, Dec. 2017, pp. 5998-6008.
Yang et al., "Breaking the softmax bottleneck:A high-rank rnn language model", arXiv:1711.03953, Nov. 2017, 18 pages.

COMPUTATIONALLY EFFICIENT EXPRESSIVE OUTPUT LAYERS FOR NEURAL NETWORKS

CROSS-REFERENCE TO RELATED APPLICATION

This application claims priority to U.S. Provisional Application No. 62/847,222, filed on May 13, 2019. The disclosure of the prior application is considered part of and is incorporated by reference in the disclosure of this application.

BACKGROUND

This specification relates to generates outputs using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes network inputs using a neural network to generate network outputs.

In particular, the described system employs a neural network that includes one more initial neural network layers. The initial layers receive a network input and generate a hidden state from the network input.

The neural network also includes a computationally efficient but expressive output layer that receives the hidden state and then maps the hidden state to a probability distribution over a set of possible outputs. The described output layer can replace a conventional output layer that outputs probability distributions, e.g., a softmax layer or a mixture of softmaxes (MOS) layer.

Particular embodiments of the subject matter described in this specification can be implemented so as to realize one or more of the following advantages.

Softmax has been a standard output layer for a wide variety of neural networks, including, for example, the majority of neural language models and machine translation models. However, Softmax is a fundamental limitation of the expressiveness of neural networks, e.g., neural language and machine translation models, because it constrains the output representations generated by the output layer to be low-rank, which might not be sufficient for modeling the complexity of natural language or other highly context dependent output vocabularies.

To improve on this, techniques have been proposed that generate higher-rank output representations. An example of such an approach is Mixture of Softmaxes (MoS), which introduces discrete latent variables into the output layer so that the log probability matrix is high-rank because of the log-sum-exp nonlinear transformation. However, MoS and other proposed solutions are computationally expensive compared to Softmax in terms of both memory and time, which makes them less practically useful when computational budgets are limited.

The described output layer (referred to as a "Mixtape" layer), on the other hand, reduces the additional computational cost while still improving on the expressiveness of Softmax. The described output layer can be plugged into any existing network as an additional layer, i.e., after the initial layers that generate the hidden state and in place of the conventional output layer of the existing network.

Instead of employing a scalar mixture in the probability space as in MoS, Mixtape applies a vector gating mechanism in the logit space to avoid using multiple computationally expensive Softmaxes.

In addition, in some implementations Mixtape also uses one or more other techniques for reducing the computational cost.

First, the vector gating mechanism can be computationally expensive because of the need to compute a Softmax gate for each word in the vocabulary to generate probabilities for the vector gating. This can be mitigated by using sigmoid tree decomposition that decomposes a Softmax probability gating distribution into a binary tree structure, where each branch carries a portion of the probability mass determined by a sigmoid function.

Computing probabilities using sigmoid tree decomposition is much more computationally efficient because it avoids the reduction and division operations in Softmax, which are computationally expensive to perform, whether in software or on special purpose hardware.

Second, gate sharing can be employed to share the gate values for all infrequent outputs, resulting in partially high-rank representations. This technique saves a considerable amount of memory and computation, i.e., because only a single gate value needs to be computed and stored for all infrequent outputs, without affecting the performance of the Mixtape layer because the gate values of infrequent outputs are generally hard to accurately estimate even without sharing the gates.

With the above techniques, Mixtape substantially improves the efficiency of MoS while obtaining comparable or even better performances on numerous tasks, including language modeling and machine translation. For example, with normal vocabulary sizes (e.g., 10K-30K possible outputs), the Mixtape layer is 1.6 to 11.5 times faster than the MoS layer given the same batch size, and is 3.5 to 10.5 times faster given the same memory budget.

Thus, the described output layer allows a neural network to achieve increased performance relative to conventional softmax output layers while mitigating the additional computational cost required to achieve the increased performance. This allows the described systems to be deployed effectively even when computational budgets are limited or when low latency processing is required, e.g., on a mobile device or on special purpose hardware that has limited processing power, limited memory, or both.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
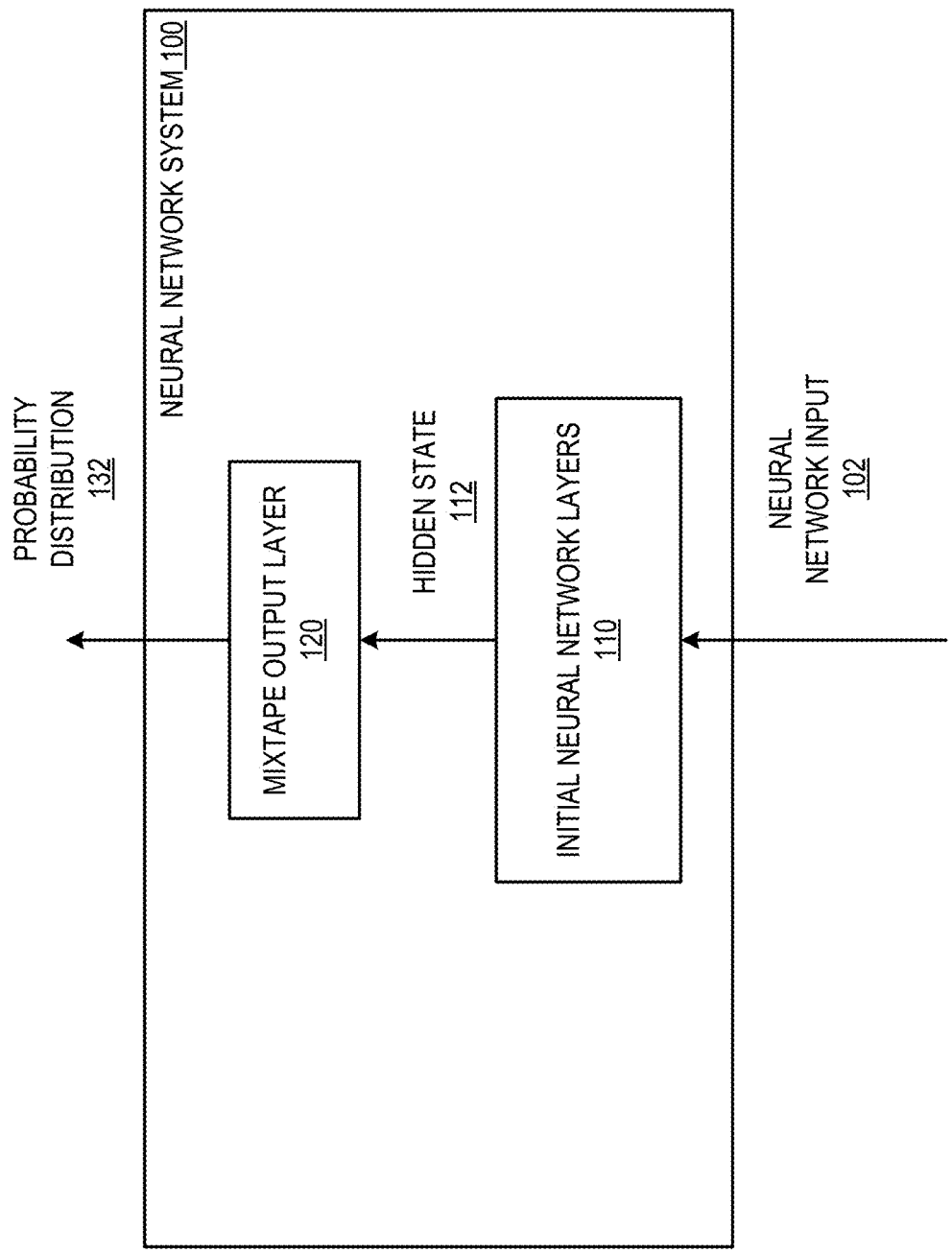
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

The system 100 includes a neural network that includes one more initial neural network layers 110. The initial layers receive a network input 102 and generate a hidden state 112 from the network input 102. The hidden state 112 will generally be the output of the last initial neural network layer or a combination of outputs from multiple initial neural network layers, e.g., if the neural network includes skip connections.

The neural network also includes a computationally efficient but expressive output layer, referred to as a Mixtape output layer 120, that receives the hidden state 112 and then maps the hidden state 112 to a probability distribution 132 over a vocabulary of possible outputs. The described output layer 120 can replace a conventional output layer that outputs probability distributions, e.g., a softmax layer or a mixture of softmaxes (MOS) layer.

Thus, the system 100 can perform any of a variety of tasks that require mapping network inputs 102 to probability distributions 132 and then either 1) selecting an output from the vocabulary of possible outputs using the probability distributions 132, e.g., by sampling from the probability distribution 132 or selecting the output with the highest probability 132 or 2) using the probability distributions 132 to compute a loss that is used in training the neural network.

In other words, the system 100 can be configured to receive any of a variety of different network inputs 102 and use the neural network to map the inputs to any of a variety of network outputs. In some cases, the network output is a single probability distribution while in other cases generating the network output requires generating a respective probability distribution for each of multiple time steps in an output sequence.

For example, the neural network may be a neural machine translation neural network. That is, if the network inputs are a sequence of words in an original language, e.g., a sentence or phrase, the network outputs can be an output sequence that is a translation of the input sequence into a target language, i.e., a sequence of words in the target language that represents the sequence of words in the original language. The neural network can then generate a respective probability distribution at each of the time steps in the output sequence and the output at the time step, e.g., the word in the translation, can be selected from the probability distribution.

As another example, the neural network may be a speech recognition neural network. That is, if the network input is a sequence of audio data representing a spoken utterance, the output sequence may be a sequence of text symbols, e.g., graphemes, characters, or words that represents the utterance, i.e., is a transcription of the input sequence. The neural network can then generate a respective probability distribution at each of the time steps in the output sequence and the output at the time step, e.g., the text symbol in the transcription, can be selected from the probability distribution.

As another example, the neural network may be a natural language processing neural network. For example, if the network input is a sequence of words in an original language, e.g., a sentence or phrase, the output sequence may be a summary of the input sequence in the original language, i.e., a sequence that has fewer words than the input sequence but that retains the essential meaning of the input sequence. As another example, if the network input is a sequence of words that form a question, the output sequence can be a sequence of words that form an answer to the question.

As another example, the neural network may be part of a computer-assisted medical diagnosis system. For example, the network input can be data from an electronic medical record and the output sequence can be one or more predicted treatments.

As another example, the system may be part of an image processing system. For example, the network input can be an image and the output can be a sequence of text that describes the image. As another example, the network input can be a sequence of text or a different context and the output sequence can be an image that describes the context. As another example, the task can be image classification, where the input is an image and the output identifies one or more categories (from a set of possible object categories) to which an object depicted in the image belongs.

The neural network can have any of a variety of architectures. That is, the initial neural network layers 110 can take any of variety of forms and perform any of a variety of operations.

For example, the neural network can have an encoder neural network to encode the network inputs and a decoder neural network to generate an output sequence from the encoded network inputs. As part of generating the output sequence, the neural network generates a probability distribution for each of multiple time steps in the output sequence and selects the output at the time step using the probability distribution for the time step.

In this example, the initial neural network layers 110 would include the encoder neural network and all of the decoder neural network except for the output layer that is replaced with the described output layer 120. In some examples, the decoder is an auto-regressive neural network, e.g., a recurrent neural network or an auto-regressive convolutional neural network or an auto-regressive attention-based neural network.

More generally, which initial neural network layers 110 are part of the neural network is also dependent on the task that the neural network is configured to perform. For example, for sequence processing tasks, the layers can include one or more of recurrent layers, e.g., (long short-term memory) LSTM layers, feed-forward layers, self-attention layers, or convolutional layers. For image classification tasks, the layers can be a convolutional neural network that generates a hidden state from the input image.

Which outputs are in the vocabulary of possible outputs over which the probability distributions 132 are generated is also dependent on the task that the neural network is configured to perform. For example, when the task is machine translation, the vocabulary includes words in a target language. When the task is speech recognition, the vocabulary can include text symbols, i.e., one or more of phonemes, characters, word pieces or words, in a target natural language alphabet. When the task is image classification, the vocabulary can include a set of labels that each identify a different object category.

Generally, the described techniques are applicable to any machine learning task that has a large vocabulary of possible outputs, e.g., tasks that have an output vocabulary of words or other text symbols in a target natural language or classification tasks that have an output vocabulary over a very large number of possible classes.

In particular, when the size of the vocabulary is large and the neural network needs to produce a probability distribution over the outputs in order to generate a network output, conventional approaches have used a Softmax layer as the output layer of the neural network.

Softmax has been a standard output layer for a wide variety of neural networks, including, for example, the majority of neural language models and machine translation models. However, Softmax is a fundamental limitation of the expressiveness of neural networks, e.g., neural language and machine translation models, because it constrains the output representations generated by the output layer to be low-rank, which might not be sufficient for modeling the complexity of natural language or other highly context dependent output vocabularies. Thus, Softmax output layers limit the accuracy of the neural network on a variety of large vocabulary tasks.

To improve on this, techniques have been proposed that generate higher-rank output representations. An example of such an approach is Mixture of Softmaxes (MoS), which introduces discrete latent variables into the output layer so that the log probability matrix is high-rank because of the log-sum-exp nonlinear transformation. However, MoS and other proposed solutions are computationally expensive compared to Softmax in terms of both memory and time, which makes them less practically useful when computational budgets are limited.

This specification, on the other hand, employs the Mixtape output layer 120. By using the Mixtape output layer 120 to generate probability distributions, the neural network can achieve performance comparable to or better than MoS while being significantly more computationally efficient than MoS.

The operations performed by the output layer 120 to map hidden states 112 to probability distributions 132 will be described in more detail below with reference to FIGS. 2-4.

Once the probability distribution 132 has been generated, the system 100 can provide, e.g., for presentation to a user or to another system, the probability distribution 132 as the network output of the system or can select one or more of the possible outputs that have the highest probabilities and provide the one or more possible network outputs as the network output of the system or use the probability distribution 132 to compute a loss during the training of the neural network. Alternatively, the system 100 can store the probability distribution 132 or the one or more possible outputs with highest scores in association with the network input 102 for later use.

Figure 2:
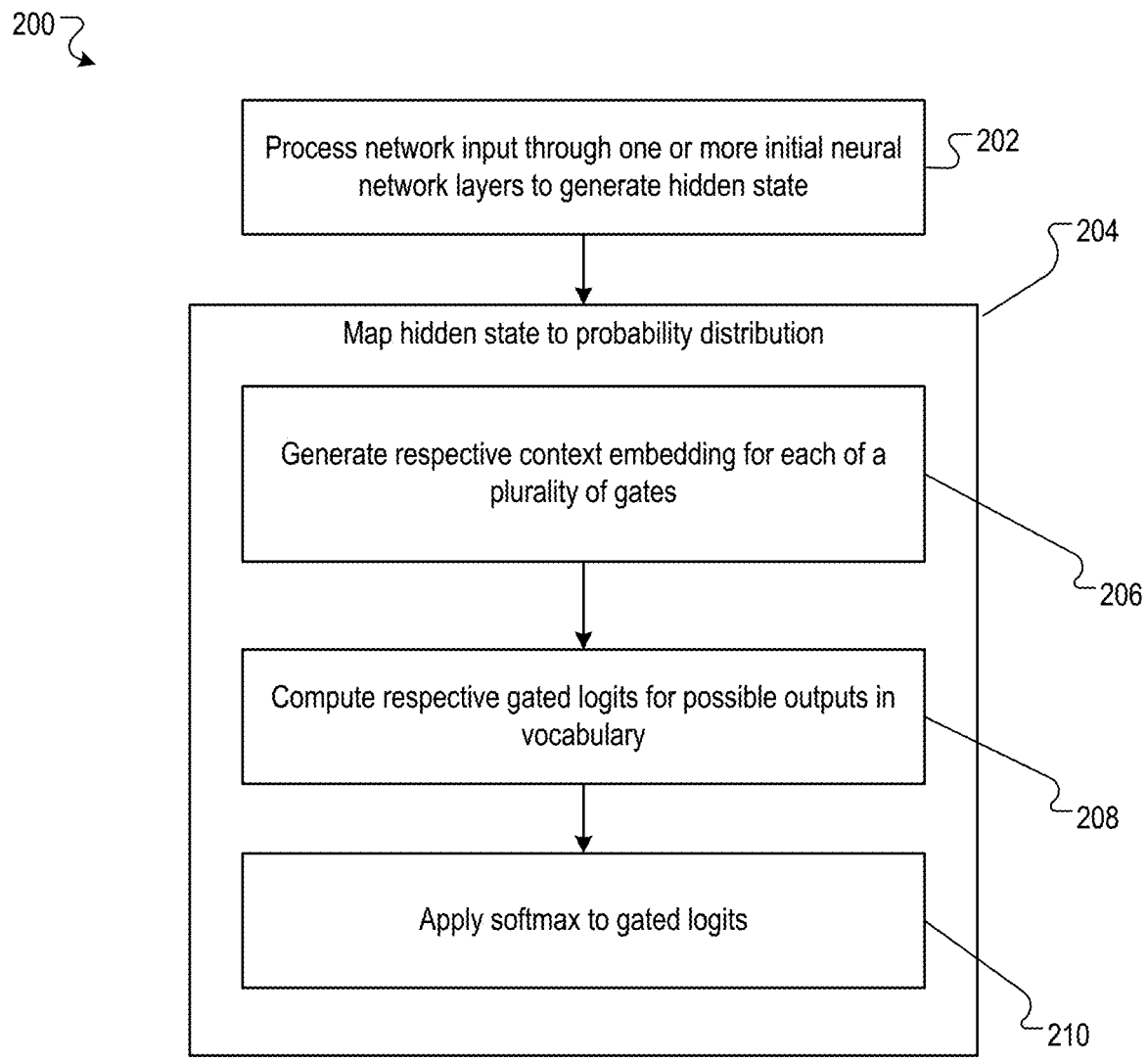
FIG. 2 shows an example of generating a network output for a received network input.

FIG. 2 is a flow diagram of an example process 200 for generating a probability distribution for a received network input. For convenience, the process 200 will be described as being performed by a system of one or more computers located in one or more locations. For example, a neural network system, e.g., the neural network system 100 of FIG. 1, appropriately programmed, can perform the process 200.

The system processes the network input using one or more initial neural network layers to generate a hidden state (step 202). The hidden state is generally a vector of numeric values having a fixed dimensionality $d_1$. The hidden state is generally the output of the last neural network layer of the one or more initial neural network layers, or, when the initial layers include skip connections or residual connections, a combination, e.g., a sum, concatenation, or average, of the outputs of two or more of the initial neural network layers.

The system processes the hidden state using the Mixtape output layer to map the hidden state to a probability distribution that includes a respective probability for each possible output in a vocabulary of possible outputs (step 204).

As part of generating the probability distribution, the Mixtape output layer generates a respective context embedding for each of a plurality of gates (step 206). An embedding is an ordered collection of numeric values that has a fixed dimensionality, e.g., a vector having a fixed number of numeric values. The number of gates K that make up the plurality is fixed, i.e., as part of the architecture of the neural network. For example, K can be equal to 4, 8, or 16.

To generate the context embedding for a given gate, the output layer can process the hidden state through one or more first feed forward neural network layers that have parameters that are specific to the gate. As a particular example, the context embedding $h_{c,k}$ for a gate k generated from a hidden state $g_c$ can satisfy:

$$h_{c,k} = \tan h(H_k g_c),$$

where $H_k$ is a $d \times d_1$ parameter matrix that is only used for the gate k.

The Mixtape output layer then generates a respective gated logit for each of the possible outputs in the vocabulary (step 208).

A logit generally refers to a score or other numeric value. Unlike a probability distribution, e.g., the probability distribution over the possible outputs, in which the probabilities for the possible outputs are required to sum to one, logits have no such requirement.

The gated logits are referred to as "gated" because they are generated by applying vector gating, i.e., by, for each possible output, computing a weighted sum of values that are specific to the gate.

Computing gated logits is described in more detail below with reference to FIG. 3.

The Mixtape output layer then applies a softmax function to the gated logits to generate the probability distribution (step 210).

That is, unlike Mixture of Softmaxes and other approaches to increase the expressiveness of the conventional softmax output layer, the Mixtape output layer only applies a single softmax function as part of generating the probability distribution.

Because the softmax function is computationally expensive, requiring computing and storing an exponentiation for each logit, only applying a single softmax greatly improves the computational efficiency of the Mixtape output layer relative to Mixture of Softmaxes and related approaches.

Figure 3:
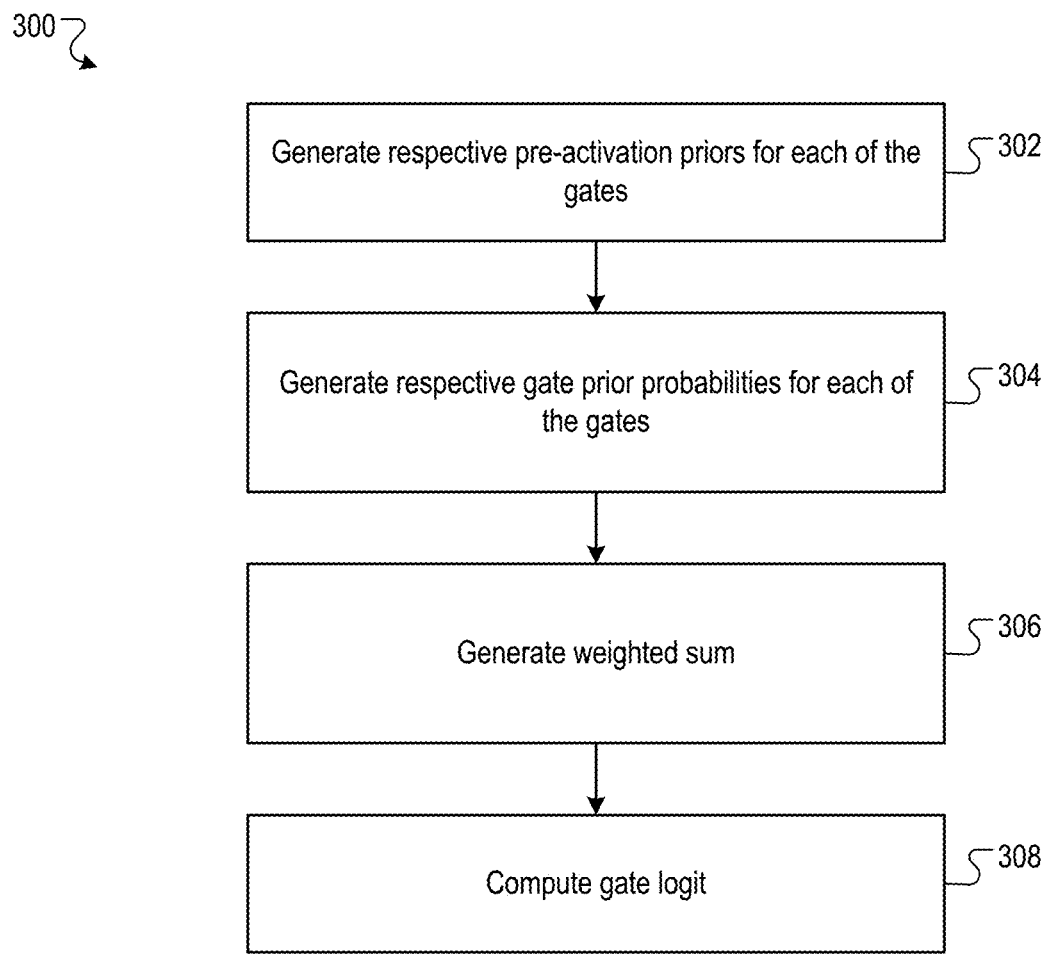
FIG. 3 is a flow diagram of an example process for generating a gated logit for a possible output.

FIG. 3 is a flow diagram of an example process 300 for generating a gated logit for a given possible output in the vocabulary. For convenience, the process 300 will be described as being performed by a system of one or more computers located in one or more locations. For example, a Mixtape output layer of a neural network system, e.g., the Mixtape output layer 120 of the neural network system 100 of FIG. 1, appropriately programmed, can perform the process 300.

The Mixtape output layer performs the process 300 for each possible output in the vocabulary to generate a respective gated logit for each possible output.

The Mixtape output layer generates, from the hidden state, a respective pre-activation prior for each of the gates for the possible output (step 302).

In some implementations, the output layer generates pre-activation priors for each possible output that are specific to the pre-activation prior.

In particular, in these implementations, for each gate, the Mixtape output layer processes the hidden state through one or more second feed forward neural network layers that have parameters that are specific to the gate and parameters that are specific to the given possible output to generate the respective pre-activation prior for the gate.

As a particular example, the pre-activation prior $l_{c,x,k}$ for the given possible output x and a given gate k can satisfy:

$$l_{c,x,k} = v_x^T \tanh(U_k g_c) + u_k^T g_c + b_{x,k},$$

where $v_x$ is a parameter vector of dimension $d_2$ that is specific to the given possible output x, $U_k$ is a parameter matrix that is $d_2$ by $d_1$ and is specific to the gate k, $g_c$ is the hidden state, $u_k$ is a parameter vector of dimension $d_1$, and $b_{x,k}$ is a bias value that is specific to the given possible output x and the given gate k.

In some other implementations, the output layer implements gate sharing. In gate sharing, the vocabulary of possible outputs is partitioned into a plurality of frequent possible outputs and a plurality of infrequent possible outputs.

For example, the partitioning can be done by an external system and provided as input to the system.

As another example, the system can perform the partitioning by assigning the top S most frequently occurring possible outputs, e.g., in ground truth outputs in a set of training data used to train the neural network, to the frequent possible output partition and assigning the remaining possible outputs in the vocabulary to the infrequent possible output partition.

When gate sharing is implemented, for each frequent possible output, the output layer generates pre-activation priors for the frequent possible output that are specific to the frequent possible output. For example, for each frequent possible output, the output layer can generate the pre-activation prior as it would when gate sharing is not being implemented, i.e., by processing the hidden state through one or more second feed forward neural network layers that have parameters that are specific to the gate and parameters that are specific to the given possible output to generate the respective pre-activation prior for the gate.

For each infrequent possible output, the output layer generates pre-activation priors for the infrequent possible output that are shared across all of the infrequent possible outputs. In other words, for a given gate k and a given hidden state, the pre-activation prior for the gate k will be the same for each of the infrequent possible outputs.

For example, for any given gate, the output layer can apply a shared parameter vector that is specific to the given gate to the hidden state to generate the shared pre-activation prior for the gate. As a particular example, the pre-activation prior $l_{c,x,k}$ for each infrequent possible output x and a given gate k can satisfy:

$$l_{c,x,k} = u_k^T g_c.$$

By generating a shared pre-activation prior for all of the infrequent possible outputs, the output layer can significantly improve the computational efficiency of generating the probability distribution. Moreover, because pre-activation priors of infrequent outputs are generally hard to accurately estimate even without sharing the gates, the system can achieve these computational savings without significant performance degradation.

The Mixtape output layer generates, from the pre-activation priors, a respective gate prior probability for each of the gates for the possible output (step 304). That is, the Mixtape output layer maps the pre-activation priors for the gates to a set of probabilities that sum to one.

In some implementations, the Mixtape output layer applies a softmax function to the pre-activation priors to generate the gate prior probabilities for the gates.

However, computing a respective softmax for each possible output in the vocabulary can be computationally expensive because the number of possible outputs is usually large.

In other implementations, in order to perform the probability computation in a more computationally efficient matter, the Mixtape output layer uses a technique referred to as sigmoid tree decomposition.

In sigmoid tree decomposition, when the total number of gates is K, the Mixtape output layer applies a sigmoid function to the pre-activation priors for K−1 of the gates to generate K−1 sigmoid outputs and then generates the K gate prior probabilities from the K−1 sigmoid outputs. Sigmoid tree decomposition is described in more detail below with reference to FIG. 4.

When using gate sharing, the output layer only needs to map the set of shared pre-activation priors for the infrequent outputs to probabilities once, and can then re-use the same gate prior probabilities for all of the infrequent outputs.

The output layer generates a weighted sum for the given possible output by computing a weighted sum of the context embeddings, with the context embedding for each gate being weighted by the gate prior probability for the gate in the weighted sum (step 406).

The output layer then computes a gated logit for the given possible output by applying an output embedding for the possible output to the weighed sum, i.e., by computing a dot product between the output embedding and the weighted sum (step 408). The output embedding is a d dimensional vector or other ordered collection of numeric values. This output embedding can be pre-trained or can be learned jointly with the training of the neural network.

In some other implementations, rather than perform step 406 followed by step 408, the Mixtape output layer instead computes the gated logit for the possible output by first applying the output embedding for the possible output to each of the context embeddings to generate K gate logits for the possible output and then computing a weighted sum of the gate logits for the possible output to generate the gated logit for the given possible output, with the gate logit for each given gate being weighted by the corresponding gate prior probability for the given gate.

Thus, the overall computation of the Mixtape output layer to assign a probability P(x|c) to the given possible output x in the vocabulary given a context c, i.e., a context as reflected in the network input and any internal state maintained by the initial neural network layers, can expressed as:

$$P(x|c) = \frac{\exp \sum_{k=1}^{K} \pi_{c,x,k} h_{c,k}^T w_x}{\sum_{x'} \exp \sum_{k=1}^{K} \pi_{c,x,k} h_{c,k}^T w_{x'}},$$

where $\pi_{c,x,k}$ is the prior probability for gate k of the K gates, $w_x$ is the output embedding for the possible output x, $h_{c,k}$ the context embedding for the gate k generated from a hidden state $g_c$, and the sum over x' is a sum over all of the possible outputs in the vocabulary.

Figure 4:
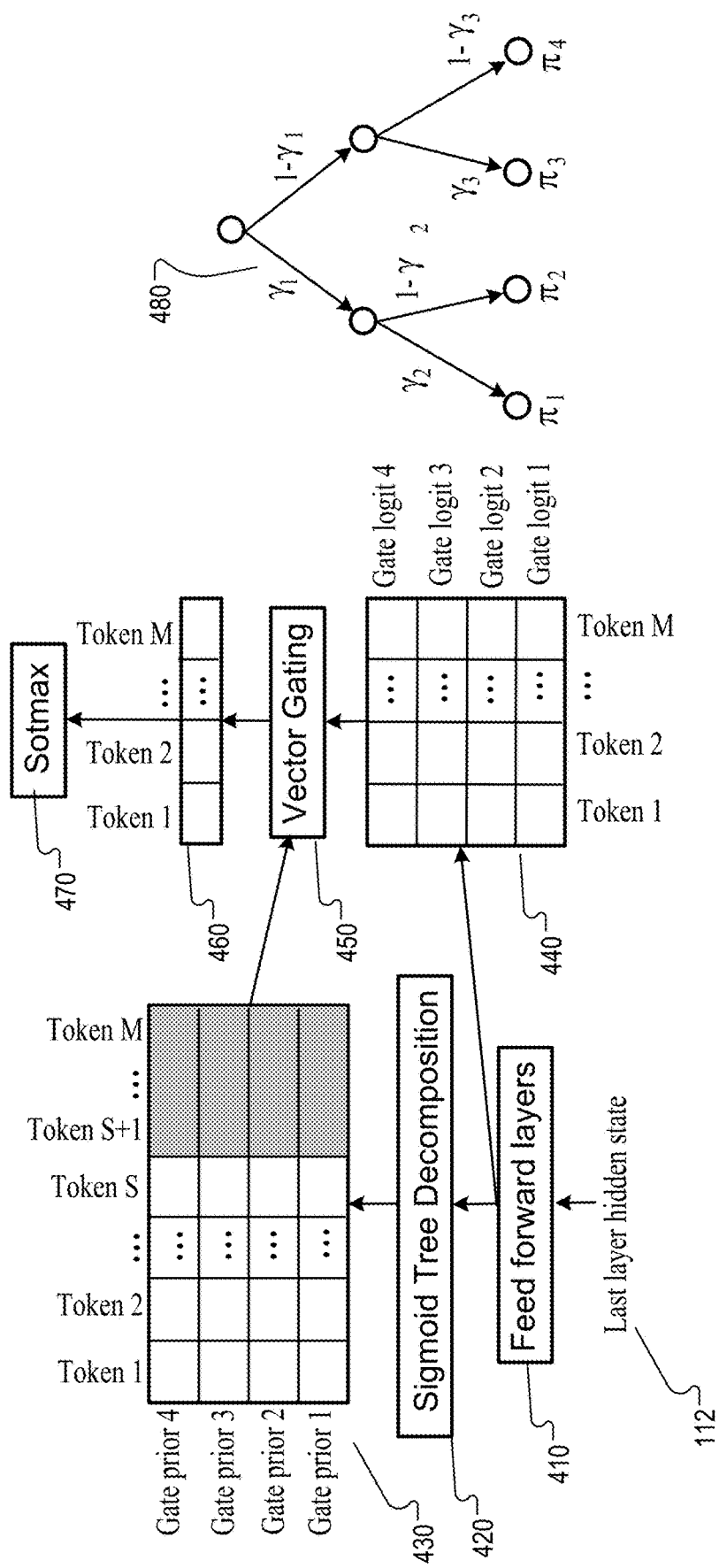
FIG. 4 is a flow diagram of an example process for training the screening model.

FIG. 4 shows an example implementation of the processing performed by the Mixtape output layer 120 to map a hidden state 112 to a probability distribution 132.

In the example of FIG. 4, the Mixtape output layer 120 uses K=4 gates and the vocabulary of possible outputs (referred to as "tokens" in the Figure) includes M possible outputs.

As shown in FIG. 4, the Mixtape output layer receives the hidden state 112 ("last layer hidden state") generated by the initial neural network layers 110.

From the hidden state 112, the output layer 120 computes gate prior probabilities 430 and gate logits 440 using a set of feed forward neural network layers 410.

The gate prior probabilities 430 include, for each of the M possible outputs, a respective gate prior probability for each of the gates. Thus, as can be seen from FIG. 4, in the example of FIG. 4 where there are K=4 gates, the gate prior probabilities 430 include 4 gate prior probabilities for each of the M possible outputs.

As described above, to compute the gate prior probabilities 430, the system first computes, for each possible output, K=4 pre-activation priors using neural network layers 410 and then generates the K=4 gate prior probabilities for the possible output from these pre-activation priors.

In particular, in the example of FIG. 4, the output layer uses sigmoid decomposition 420 to generate the prior probabilities 430 from the pre-activation priors.

Diagram 480 illustrates the applying of sigmoid tree decomposition 420 when K=4 using K−1 sigmoid outputs. Generally, when applying sigmoid tree decomposition, the output layer decomposes a softmax distribution into a tree structure of sigmoid function.

Specifically, the output layer uses the K−1 sigmoid outputs to define the probabilities along the tree branches. In particular, as shown in diagram 480, each edge in the sigmoid tree is a probability computed using sigmoid functions. Each gate prior probability is the product of the probabilities along the path from the root to the leaf. For example, the decomposition depicted in diagram 480 can be expressed as:

$$\gamma_{c,x,k} = \sigma(l_{c,x,k}) \text{ for } k=1 \ldots K-1$$

$$\pi_{c,x,1} = \gamma_{c,x,1}\gamma_{c,x,2}$$

$$\pi_{c,x,2} = \gamma_{c,x,1}(1-\gamma_{c,x,2})$$

$$\pi_{c,x,3} = (1-\gamma_{c,x,1})\gamma_{c,x,3}$$

$$\pi_{c,x,3} = (1-\gamma_{c,x,1})(1-\gamma_{c,x,3}),$$

where σ is the sigmoid function.

Thus, the system can avoid performing the reduction and division operations that would be required to perform a Softmax on the pre-activation priors when computing the prior probabilities.

Additionally, in the example of FIG. 4, the output layer is implementing gate sharing. Thus, the gate priors 430 for each frequent possible output (i.e., tokens 1 . . . S), are generated from pre-activation priors for the frequent possible output that are specific to the frequent possible output and can therefore differ. For each infrequent possible output (i.e., tokens S+1 . . . M, the gate priors 430 are generated from pre-activation priors that are shared across all of the infrequent possible outputs and are therefore all the same.

The gate logits 440 include, for each of the M possible outputs, a respective logit for each of the gates. Thus, as can be seen from FIG. 4, in the example of FIG. 4 where there are K=4 gates, the gate logits 440 include 4 logits for each of the M possible outputs.

In particular, to generate the gate logits 440, the output layer first generates a respective context embedding for each of the plurality of gates by, for each of the gates processing the hidden state through one or more first feed forward neural network layers of the layers 410 having parameters that are specific to the gate.

The output layer then applies, for each of the M possible outputs, an output embedding for the possible output to each of the context embeddings to generate the K gate logits for the possible outputs. In other words, to generate the gate logit for a gate k for any given possible output m, the output layer computes a dot product between the context embedding for the gate k and the context embedding for the possible output m.

The Mixtape output layer then performs vector gating 450 using the gate prior probabilities 430 and gate logits 440 to generate gated logits 460 that include a single respective gated logit for each of the M possible outputs.

To perform the vector gating 450 for each of the possible outputs, the output layer computes a weighted sum of the gate logits for the possible output to generate the gated logit for the possible output, with the gate logit for each given gate being weighted by the corresponding gate prior probability for the given gate.

It should be noted that the processing performed to generate gated logits 460 in the example illustrated in FIG. 4 is mathematically equivalent to the techniques described above, in which to generate the gated logit for a given possible output, the output layer first computes a weighted sum for the given possible output by computing a sum of the context embeddings for the gates (with the context embedding for each gate weighted by the gate prior probability for the gate for the given possible output) and then computes a gated logit for the possible output by applying an output embedding for the possible output to the weighed sum.

The output layer then applies a Softmax function 470 to the gated logits 460 to map the gated logits 460 to the probability distribution 132.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by one or more computers cause the one or more computers to implement a neural network, the neural network comprising:
   one or more initial neural network layers configured to receive a network input to the neural network and to process the network input to generate a hidden state; and
   an output layer configured to map the hidden state to a probability distribution over a vocabulary of possible outputs by performing operations comprising:
   receiving the hidden state;
   generating, from the hidden state, a respective context embedding for each of a plurality of gates;
   for each of the possible outputs in the vocabulary:
   generating, from the hidden state, a respective pre-activation prior for each of the gates for the possible output;
   generating, from the pre-activation priors, a respective gate prior probability for each of the gates for the possible output;
   generating a weighted sum for the possible output by computing a sum of the context embeddings with the context embedding for each gate weighted by the gate prior probability for the gate; and
   computing a gated logit for the possible output by applying an output embedding for the possible output to the weighed sum; and
   generating the probability distribution over the vocabulary of possible outputs by applying a softmax to the gated logits for the possible outputs in the vocabulary.

2. The system of claim 1, wherein generating the respective context embedding for each of the plurality of gates comprises, for each of the gates:
   processing the hidden state through one or more first feed forward neural network layers having parameters that are specific to the gate.

3. The system of claim 1, wherein generating, from the hidden state, the respective pre-activation prior for each of the gates for the possible output comprises:
   processing the hidden state through one or more second feed forward neural network layers having parameters that are specific to the gate.

4. The system of claim 3, wherein generating, from the hidden state, the respective pre-activation prior for each of the gates for the possible output further comprises:
   applying, to the hidden state, parameters that are specific to the given possible output.

5. The system of claim 1, wherein the vocabulary of possible outputs is partitioned into a plurality of frequent possible outputs and a plurality of infrequent possible outputs, and wherein generating, from the hidden state, the pre-activation priors for the possible output comprises:
   for each frequent possible output, generating pre-activation priors for the frequent possible output that are specific to the frequent possible output, and
   for each infrequent possible output, generating pre-activation priors for the infrequent possible output that are shared across all of the infrequent possible outputs.

6. The system of claim 5, wherein generating pre-activation priors that are shared across all of the infrequent possible outputs comprises, for each gate:
   applying a shared parameter vector that is specific to the gate to the hidden state to generate the shared pre-activation prior for the gate.

7. The system of claim 1, wherein a total number of gates in the plurality of gates is equal to K, and wherein, generating, from the pre-activation priors, a respective gate prior probability for each of the gates for the possible output comprises:
   applying a sigmoid function to the pre-activation priors for K−1 of the gates to generate K−1 sigmoid outputs; and generating the K gate prior probabilities from the K−1 sigmoid outputs.

8. The system of claim 1, wherein the instructions further cause the one or more computers to implement:
a subsystem, wherein the subsystem is configured to:
select a possible output from the vocabulary of possible outputs using the probability distribution.

9. The system of claim 1, wherein the network input is one of a sequence of network inputs and wherein the system generates a respective output for each network input in the sequence.

10. One or more non-transitory computer-readable storage media storing instructions that when executed by one or more computers cause the one or more computers to implement a neural network, the neural network comprising:
one or more initial neural network layers configured to receive a network input to the neural network and to process the network input to generate a hidden state; and
an output layer configured to map the hidden state to a probability distribution over a vocabulary of possible outputs by performing operations comprising:
receiving the hidden state;
generating, from the hidden state, a respective context embedding for each of a plurality of gates;
for each of the possible outputs in the vocabulary:
generating, from the hidden state, a respective pre-activation prior for each of the gates for the possible output;
generating, from the pre-activation priors, a respective gate prior probability for each of the gates for the possible output;
generating a weighted sum for the possible output by computing a sum of the context embeddings with the context embedding for each gate weighted by the gate prior probability for the gate; and
computing a gated logit for the possible output by applying an output embedding for the possible output to the weighed sum; and
generating the probability distribution over the vocabulary of possible outputs by applying a softmax to the gated logits for the possible outputs in the vocabulary.

11. The non-transitory computer-readable storage media of claim 10, wherein the vocabulary of possible outputs is partitioned into a plurality of frequent possible outputs and a plurality of infrequent possible outputs, and wherein generating, from the hidden state, the pre-activation priors for the possible output comprises:
for each frequent possible output, generating pre-activation priors for the frequent possible output that are specific to the frequent possible output, and
for each infrequent possible output, generating pre-activation priors for the infrequent possible output that are shared across all of the infrequent possible outputs.

12. A method performed by one or more computers, the method comprising:
receiving a hidden state generated from a network input by one or more initial neural network layers; and
processing the hidden state using an output layer to map the hidden state to a probability distribution over a vocabulary of possible outputs by performing operations comprising:
receiving the hidden state;
generating, from the hidden state, a respective context embedding for each of a plurality of gates;
for each of the possible outputs in the vocabulary:
generating, from the hidden state, a respective pre-activation prior for each of the gates for the possible output;
generating, from the pre-activation priors, a respective gate prior probability for each of the gates for the possible output;
generating a weighted sum for the possible output by computing a sum of the context embeddings with the context embedding for each gate weighted by the gate prior probability for the gate; and
computing a gated logit for the possible output by applying an output embedding for the possible output to the weighed sum; and
generating the probability distribution over the vocabulary of possible outputs by applying a softmax to the gated logits for the possible outputs in the vocabulary.

13. The method of claim 12, wherein generating the respective context embedding for each of the plurality of gates comprises, for each of the gates:
processing the hidden state through one or more first feed forward neural network layers having parameters that are specific to the gate.

14. The method of claim 12, wherein generating, from the hidden state, the respective pre-activation prior for each of the gates for the possible output comprises:
processing the hidden state through one or more second feed forward neural network layers having parameters that are specific to the gate.

15. The method of claim 14, wherein generating, from the hidden state, the respective pre-activation prior for each of the gates for the possible output further comprises:
applying, to the hidden state, parameters that are specific to the given possible output.

16. The method of claim 12, wherein the vocabulary of possible outputs is partitioned into a plurality of frequent possible outputs and a plurality of infrequent possible outputs, and wherein generating, from the hidden state, the pre-activation priors for the possible output comprises:
for each frequent possible output, generating pre-activation priors for the frequent possible output that are specific to the frequent possible output, and
for each infrequent possible output, generating pre-activation priors for the infrequent possible output that are shared across all of the infrequent possible outputs.

17. The method of claim 16, wherein generating pre-activation priors that are shared across all of the infrequent possible outputs comprises, for each gate:
applying a shared parameter vector that is specific to the gate to the hidden state to generate the shared pre-activation prior for the gate.

18. The method of claim 12, wherein a total number of gates in the plurality of gates is equal to K, and wherein, generating, from the pre-activation priors, a respective gate prior probability for each of the gates for the possible output comprises:
applying a sigmoid function to the pre-activation priors for K−1 of the gates to generate K−1 sigmoid outputs; and
generating the K gate prior probabilities from the K−1 sigmoid outputs.

19. The method of claim 12, further comprising:
selecting a possible output from the vocabulary of possible outputs using the probability distribution.

20. The method of claim 12, wherein the network input is one of a sequence of network inputs.

* * * * *